United States Patent [19]

Singleton

[11] Patent Number: 4,811,966

[45] Date of Patent: Mar. 14, 1989

[54] KERB CLIMBING DEVICE

[75] Inventor: John M. Singleton, Solihull, England

[73] Assignee: The Spastics Society, London, England

[21] Appl. No.: 140,724

[22] Filed: Jan. 4, 1988

[30] Foreign Application Priority Data

Jan. 13, 1987 [GB] United Kingdom ................ 8700686

[51] Int. Cl.4 ................................................ B62B 9/02

[52] U.S. Cl. .......................... 280/5.32; 280/DIG. 10; 280/304.1

[58] Field of Search ...................... 280/5.2, 5.26, 5.32, 280/5.28, 47.12, DIG. 10, 289 WC, 242 WC; 180/8.1, 8.2, 8.3, 8.4, 907; 297/DIG. 4; 254/422

[56] References Cited

U.S. PATENT DOCUMENTS

| | | | |
|---|---|---|---|
| 2,701,005 | 2/1955 | Bennett | 280/5.32 |
| 3,580,591 | 5/1971 | Coffey | 280/5.28 |
| 3,905,437 | 9/1975 | Kaiho | 280/5.3 |
| 4,132,423 | 1/1979 | Chant | 280/5.3 |

FOREIGN PATENT DOCUMENTS

| | | | |
|---|---|---|---|
| 3006411 | 9/1981 | Fed. Rep. of Germany | 180/8.2 |
| 570806 | 5/1924 | France | 280/5.2 |
| 1151220 | 1/1958 | France | 280/5.32 |

*Primary Examiner*—Charles A. Marmor
*Assistant Examiner*—Everett G. Diederiks, Jr.
*Attorney, Agent, or Firm*—Larson and Taylor

[57] ABSTRACT

A kerb climbing device for a wheelchair having a pair of wheels of relatively small diameter comprises a guide arm and a lifting arm mounted centrally between the wheels for pivotal movement about a horizontal axis extending between opposed sides of the wheelchair. The guide arm and lifting arm extend forwardly of the wheels in an operative position of the device in which the free end of the lifting arm is spaced above the free end of the guide arm. The free end of the guide arm is arranged for locating against the kerb and the lifting arm is pivotal in response to engagement of the free end of the guide arm with the kerb to lower the free end of the lifting arm onto the kerb and lift the wheels of the ground thereby facilitating mounting of the kerb.

20 Claims, 2 Drawing Sheets

KERB CLIMBING DEVICE

BACKGROUND OF THE INVENTION

The present invention relates to devices for use with wheelchairs having at least one ground engaging wheel of relatively small diameter to enable the wheelchair to mount raised obstacles in its path, for example kerbs, steps and the like. For convenience such devices will hereinafter be referred to as kerb climbing devices, it being understood that the term "kerb" embraces all kinds of raised obstacle which may be encountered in use of a wheelchair.

A kerb climbing device for a wheelchair having a pair of castor wheels at the front and a pair of larger diameter wheels at the rear is known from U.S. Pat. No. 4,132,423 and UK Patent Application No. 2,145,983-A, comprising a strut pivotally mounted on the wheelchair and carrying an arcuate ground engaging shoe at the free outer end. The strut is biassed by a spring to an operative position projecting forwardly of the castor wheels with the shoe raised clear of the ground for engagement with the upper front edge of a kerb to be mounted whereupon the strut is pivotal under the forward momentum of the wheelchair to lift the castor wheels off the ground onto the kerb.

With this type of kerb climbing device, the shoe must have a considerable arcuate extent in order to cooperate with any one of a range of different kerb heights and this can give rise to problems both in fitting the device where the space available is restricted and in use where the upward pojection of the shoe presents a safety hazard.

A further problem is that the point of contact between the shoe and the kerb lies on the longitudinal axis of the strut for one kerb height only and for all other kerb heights is offset so that the loads acting on the strut during lifting of the wheels generate forces tending to bend the strut.

It is an object of the present invention to provide a kerb climbing device which mitigates the aforementioned problems of the known device.

SUMMARY OF THE INVENTION

According to the present invention, I provide a kerb climbing device for use with a wheelchair having at least one ground engaging wheel of relatively small diameter, the device comprising a guide arm adapted to be mounted on the wheelchair to extend forwardly of the small diameter wheel for locating a kerb in an operative position of the device and a lifting arm adapted to be mounted on the wheelchair to extend forwardly of the wheel above the guide arm in the operative position of the device and pivotal in response to engagement of the guide arm with the kerb to engage the kerb and lift the wheel off the ground.

In the invented kerb climbing device, the lifting arm is automatically adjustable for a range of kerb heights by the guide arm which locates the kerb causing the lifting arm to pivot and lower the free end of the lifting arm onto the kerb.

In this way the point of contact between the free end of the lifting arm and the kerb is the same for all kerb heights so that the forces generated by the loads acting on the arm during lifting always act along the axial length of the arm and forces tending to bend the arm are substantially eliminated.

Preferably the guide arm is axially telescopic to adjust automatically the length thereof when located against the kerb for pivotal movement of the lifting arm and the lifting arm is axially rigid to provide a strut of fixed length for withstanding the lifting loads.

The lifting arm and guide arm are conveniently adapted to be mounted on the wheelchair for pivotal movement about a substantially horizontal axis extending between opposed sides of the wheelchair and means is provided for biassing the lifting arm and guide arm to the operative position. In this way, the lifting arm and guide arm are positively held in the operative position for locating the guide arm against a kerb and the biassing means permits pivotal movement of the lifting arm for lowering the free end of the lifting arm onto the kerb.

Advantageously the lifting arm and guide arm are connected to a pivot member comprising a shaft journalled for rotation about the horizontal axis in respective mounting brackets adapted for mounting on opposed sides of the wheelchair. In a preferred arrangement the lifting arm and guide arm comprise respective limbs of a member of generally V-shape in side elevation connected at the apex to the shaft for rotation therewith.

The mounting brackets are preferably releasable for detachably mounting the device on the wheelchair and are preferably adjustable relative to each other for mounting the device on wheelchairs of different width.

The lifting arm and guide arm are preferably pivotal between the operative position and an inoperative position in which the lifting arm and guide arm extend rearwardly of said small diameter wheel and are raised clear off the ground for use of the wheelchair on substantially flat surfaces for which the kerb climbing device is not required.

Conveniently the biassing means for the lifting arm and guide arm comprises an over center spring linkage which biasses the lifting arm and guide arm to each of the operative and inoperative positions. As a result, the lifting arm and guide arm are automatically returned to the inoperative position in use of the device when the small diameter wheel of the wheelchair is lifted onto the kerb.

Preferably the over-center spring linkage adopts an equilibrium position in each of the operative and inoperative positions permitting limited resilient deflection of the device. In this way, obstructions and surface irregularities which the small diameter wheel can negotiate are accommodated without activating the device when in the operative position and larger obstructions or surface irregularities over which the wheelchair may pass are accommodated without risk of damage to the device when in the inoperative position.

Advantageously, the lifting arm and guide arm are pivotal between the operative and inoperative positions by means of a manually operable lever positioned so as to be accessible to the occupant of the wheelchair for positioning the device as required.

The lifting arm and guide arm are preferably constructed and arranged so that the free ends thereof lie in a common substantially horizontal plane in the inoperative position and a common substantially vertical plane in the operative position.

Advantageously the lifting arm has a friction device such as a rubber foot at the free end to increase the frictional engagement between the lifting arm and the kerb to prevent the lifting arm slipping.

The guide arm preferably has a jockey wheel at the free end to enable the guide arm to ride over minor surface irregularities and to assist in locating the guide arm against the kerb.

According to a second aspect of the present invention, I provide a wheelchair including first and second pairs of ground engaging wheels, the first pair being of relatively small diameter, and a kerb climbing device according to the first aspect of the invention for assisting the first pair of wheels to mount a kerb.

Advantageously the lifting arm and guide arm are mounted centrally between the small diameter wheels for pivotal movement about a substantially horizontal axis extending between opposed sides of the wheelchair and means is proivided for biassing the lifting arm and guide arm to the operative position.

Preferably the lifting arm and guide arm are connected to pivot member comprising a shaft journalled for rotation about the horizontal axis in respective mounting brackets secured to opposed sides of the wheelchair.

The lifting arm and guide arm are preferably pivotal between the operative position and an inoperative position in which the lifting arm and guide arm extend rearwardly of the first pair of wheels, and the biassing means comprises an over-center spring linkage biassing the lifting arm and guide arm to each of the operative and inoperative positions.

The device extends between and is detachably secured to opposed sides of the wheelchair by releasable mounting means and the mounting means is preferably adjustable for mounting the device on wheelchairs of different width.

Advantageously each of the second pair of wheels is powered by a respective electric motor. Each motor is preferably independently connected to one or more batteries through a control unit having a manually operable joystock for controlling forward, reverse and turning movement as well as the speed. Advantageously, each motor is pivotal to disengage the drive to facilitate manual pushing of the wheelchair.

Alternatively or in addition to the electric drive, the second pair of wheels may be adapted for manual self-propulsion of the wheelchair. For example, each wheel may have a respective hand grip.

The first pair of wheels is preferably at the front of the wheelchair with the second pair of wheels being at the rear. The first pair of wheels may comprise castor wheels and the second pair of wheels may comprise pneumatic tyres supported on a wheel rim.

The invention will now be described in more detail by way of example only with reference to the accompanying drawings.

DETAILED DESCRIPTION OF THE EXEMPLARY EMBODIMENT

Figure 1:
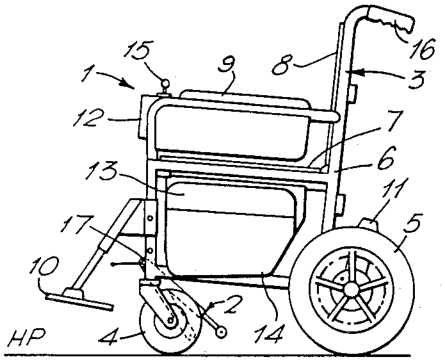
FIG. 1 is a side view of a wheelchair fitted with a kerb climbing device according to the present invention, the device being shown in the inoperative position.

In the following description of a wheelchair 1 fitted with a kerb climbing device 2 according to the present invention, the wheelchair 1 is of a known type generally comprising a frame 3 mounted on a pair of front castor wheels 4 of relatively small diameter and a pair of driven rear wheels 5.

The frame 3 comprises a pair of similar laterally spaced side frame members 6 (one only shown) connected by hinge means (not shown) which enable the wheelchair 1 to be collapsed to a folded position in which the side frame members 3 lie alongside each other.

Seat and back rest panels 7 and 8 respectively of flexible material such as canvas extend between the side frame members 6 and each side frame member 6 has detachable arm and foot rests 9 and 10 respectively.

Each rear wheel 5 is driven by a respective electric motor 11 independently connected through a control unit 12 mounted on one of the side frame members 6 to pair of re-chargeable batteries 13 supported beneath the seat panel 7 in respective removable containers 14 each attached to a respective side frame member 6.

The control unit 12 has a manually operable joystick 15 which is movable forwards, backwards and sideways from a neutral centre position so that, by appropriate movement of the joystick 15, one or both motors 11 is energised to select forward, reverse and turning movement of the wheelchair 1 with the speed being controlled by the extent of displacement of the joystick 15 from the neutral position.

In addition, each motor 11 is mounted for pivotal movement relative to the associated wheel 5 to enable the drive connection to be disengaged to facilitate manual pushing of the wheelchair 1 by an attendant using respective handgrips 16 (by only shown) provided by each side frame member 6.

The kerb climbing device 2 extends between and is releasably secured to the side frame members 6 above the front castor wheels 4 by respective mounting brackets 17.

The kerb climbing device 2 includes a lifting arm 18 and a guide arm 19 positioned centrally between the front castor wheels 4.

Figure 8:
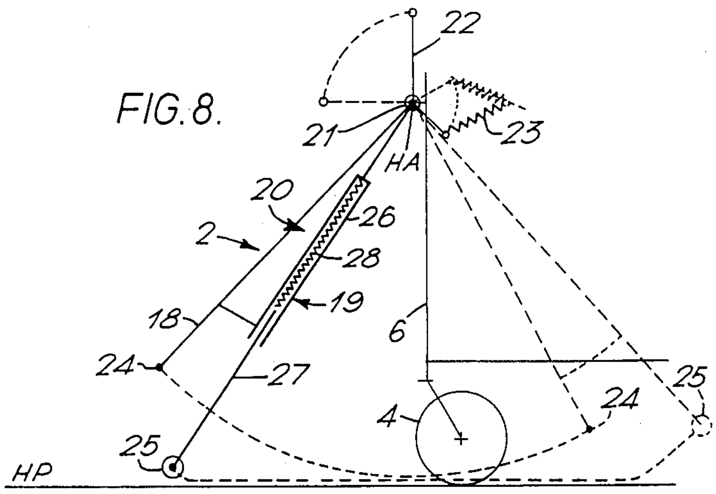
FIG. 8 is an enlarged diagrammatic side view of part of the wheelchair showing the kerb climbing device in greater detail.

As shown in greater detail in FIG. 8, the lifting arm 18 and guide arm 19 comprise respective divergent limbs of a generally V-shaped member 20. The member 20 is connected at the apex to a pivot member comprising a transverse shaft 21 journalled adjacent each end in the mounting brackets 17 for rotation about a horizontal axis HA coaxial with the longitudinal axis of the shaft 21. One of the brackets 17 is axially slidable on the shaft 21 whereby the device 2 may be adapted for fitting to wheelchairs 1 having different widths between the side frame members 6.

Secured to opposed ends of the shaft 21 outboard of the mounting brackets 17 are respective manually operable levers 22 accessible to the occupant of the wheelchair 1 for pivoting the device 2 about the horizontal axis HA through 90° between an inoperative or stored position shown in broken lines in FIG. 8 and operative or ready position shown in full lines in FIG. 8.

The device 2 is resiliently biassed to each of the inoperative and operative positions by means of an overcenter compression spring linkage indicated generally by reference numeral 23 in FIG. 8.

The lifting arm 18 has a ground engaging rubber foot 24 at the free end and is axially rigid having a fixed length slightly less than the height of the pivot axis HA above a horizontal plane HP containing the lower peripheral surface of the castor wheels 4. In this way clearance is provided between the foot 24 and the ground for pivotal movement of the kerb climbing device 2 between the inoperative and operative positions.

The guide arm 19 has a ground engaging jockey wheel 25 at the free end and is axially telescopic comprising an outer section 26 and an inner section 27 slidably received therein to adjust telescopically the length thereof. A compression spring 28 acting between the sections 26,27 biasses the guide arm 19 to an extended length greater than the height of the pivot axis PA above the plane HP and the inner section 27 is slidable into the outer section 26 against the biassing of the spring 28. In this way the length of the arm 19 is automatically shortened for pivotal movement of the kerb climbing device 2 between the inperative and operative positions.

In the inoperative position of the device 2 for use of the wheelchair 1 on substantially flat ground, both arms 18,19 extend rearwardly of the front castor wheels 4 with the rubber foot 24 and jockey wheel 25 raised clear off the ground.

In this position, the spring loading of the overcenter linkage 23 enables the device 2 to be deflect on striking any localised surface irregularity such as a brick or stone passing between the front castor wheels 4 so as to avoid damaging the device 2.

In the operative position of the device 2 for assisting the wheelchair 1 to mount a kerb, both arms 18,19 extend forwardly of the front castor wheels 4 with the jockey wheel 25 adjacent to the ground for locating against a kerb of a height greater than that which the castor wheels 4 can mount and the rubber foot 24 spaced above the jockey wheel 25 for lifting the castor wheels 4 onto the kerb.

In this position, the height of the foot 24 above the ground corresponds to the maximum height of the kerb that can be mounted and the jockey wheel 25 is raised approximately ½" above the horizontal plane so that the guide arm 19 assisted by the spring loading of the overcenter linkage 23 rides over any obstruction that can be mounted by the castor wheels 4 without assistance thereby ensuring that the device 2 is activated only when required.

As shown, the foot 24 and jockey wheel 25 lie in substantially common horizontal and vertical planes in the inoperative and operative positions respectively. It will be understood, however, that this is not essential provided that, in the inoperative position, both are raised clear of the ground and that, in the operative position, the jockey wheel 25 is on or, more preferably, adjacent to the ground and the foot 24 is raised clear of the ground and the jockey wheel 25.

The over-center spring linkage 23 may be any suitable construction but preferably comprises a piston slidably mounted in a cylinder and biassed to an extended equilibrium position by a compression spring. The free outer end of the piston is pivotally connected to the shaft 21 and the cylinder is pivotally connected to the fixed mounting bracket 17 by respective links for the overcentre movement. The axial length of the piston is adjustable on installation to set the height of the jockey wheel 25 above the ground in the operative position of the device 2 and the compression spring permits movement of the piston into and out of the cylinder from the extended equilibrium position for deflection of the device 2 in the operative and inoperative positions as above-described.

The operation of the kerb climbing device 2 will now be described in more detail starting with FIG. 1 where the device 2 is shown in the inoperative position in which both arms 18,19 extend rearwardly of the front castor wheels 4 between the battery containers 14 with the rubber foot 24 and jockey wheel 25 raised clear of the ground for use of the wheelchair 1 on substantially flat ground.

Figure 2:
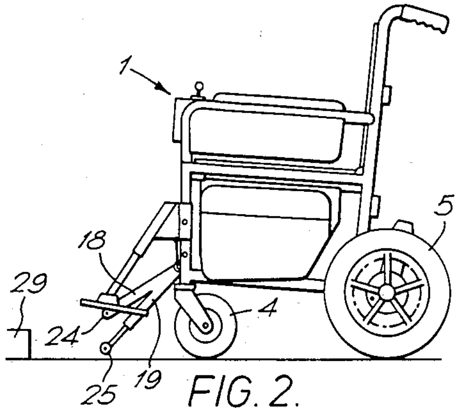
FIG. 2 is a side view of the wheelchair showing the kerb climbing device in the operative position.

For mounting a kerb 29 higher than that which the front castor wheels 4 can ride over, the device 2 is pivotted to the operative position shown in FIG. 2 in which both arms 18,19 extend forwardly of the front castor wheels 4 between the footrests 10 with the jockey wheel 25 adjacent to the ground and the rubber foot 24 spaced above the jockey wheel 25.

Figure 3:
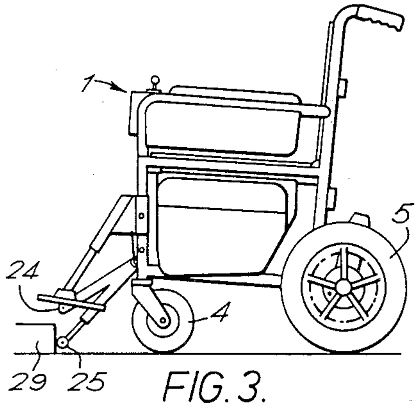
FIGS. 3,4 and 5 are side views of the wheelchair showing different positions of the kerb climbing device during mounting of a kerb.

With the device 2 in the operative position, the wheelchair 1 is driven towards the kerb 29 causing the jockey wheel 25 to locate against the vertical front face of the kerb 29 with the rubber foot 24 spaced above the upper surface of the kerb 29 as shown in FIG. 3.

Figure 4:
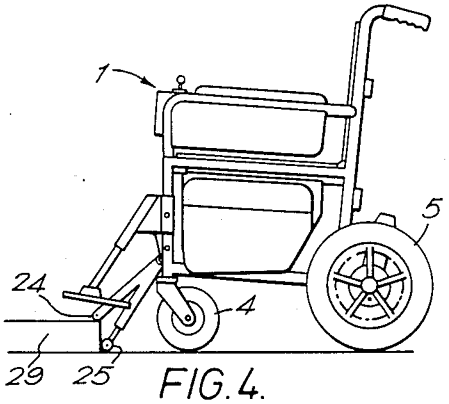

On continuing forward movement of the wheelchair 1, the jockey wheel 25 runs down into the corner between the kerb 29 and ground whereupon the guide arm 19 telescopes and pivots in the anticlockwise direction causing simultaneous pivotal movement of the lifting arm 18 in the same direction to lower the rubber foot 24 into engagement with the upper surface of the kerb 29 as shown in FIG. 4.

Figure 5:
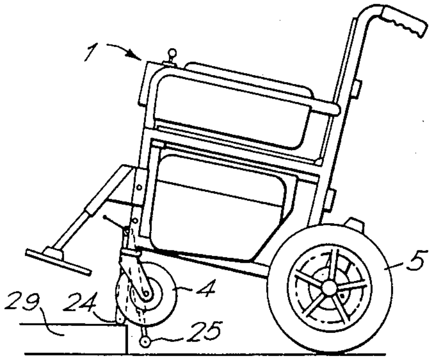

On continuing forward movement of the wheelchair 1, the lifting arm 18 is located by the frictional engagement between the foot 24 and the upper surface of the kerb 29 and pivots in the anticlockwise direction to lift the front castor wheels 4 of the ground as shown in FIG. 5. In this way, the front castor wheels 4 are raised sufficiently to engage the upper surface of the kerb 29 under the forward momentum of the wheelchair 1.

Figure 6:
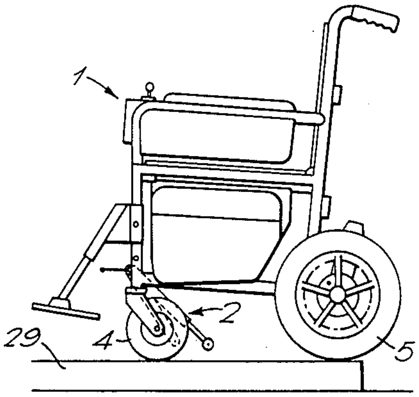
FIG. 6 is a side view showing the wheelchair mounted on the kerb.

On continuing forward movement of the wheelchair, the kerb climbing device 2 is automatically returned to the inoperative position by the over center compression spring linkage 23 and the larger diameter rear wheels 5, driven by the respective motors 11, ride over the kerb 29 to complete mounting of the kerb 29 by the wheelchair 1 as shown in FIG. 6.

Figure 7:
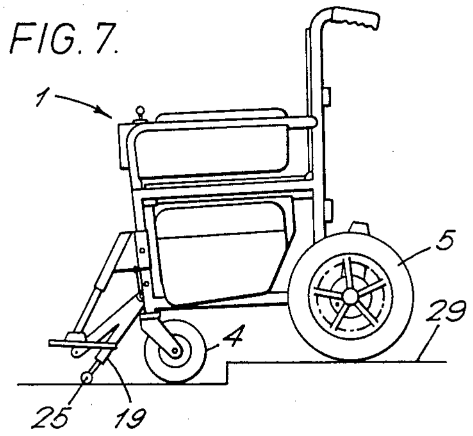
FIG. 7 is a side view showing the wheelchair descending the kerb with the kerb climbing device in the operative position acting as a steady.

Referring now to FIG. 7, the kerb climbing device 2 is shown in the operative position acting as a steady for the wheelchair 1 on descending the kerb 29 through the engagement of the jockey wheel 25 of the telescopic guide arm 19 with the ground during the descent of the kerb 29 by the front castor wheels 4.

As will be appreciated from the foregoing description, by arranging for the guide arm to locate against the kerb and pivot the lifting arm to engage the upper surface of the kerb, the lifting arm is automatically adjusted for different kerb heights up to the maximum height determined by the height of the rubber foot above the ground in the operative position.

In this way the point of contact between the lifting arm and the kerb is the same for all kerb heights so that the forces generated by the loads acting on the lifting arm during pivotal movement to lift the castor wheels always acts along the length of the arm.

It will also be understood that the invented kerb climbing device is not limited to the particular embodiment above-described. For example, the device may comprise separate guide and lifting arms each mounted on the shaft and connected by link means for simultaneous pivotal movement. The link means may be adjustable to raise and lower the lifting arm relative to the guide arm in the operative position for adjusting the maximum height of kerb that can be negotiated by the device.

The kerb climbing device may have one pair of lifting and guide arms positioned centrally between the front castor wheels as described or two pairs of lifting and guide arms may be provided, one for each castor wheel. Where two pairs are provided each pair may have its own shaft and operating lever or a common shaft and operating lever may be provided for both pairs.

In addition the invented kerb climbing device may be used with different types of wheelchair. For example the wheelchair may be folding or non-folding.

The small diameter wheels may be provided at the front or rear and may be castoring or non-castoring.

The large diameter wheels may be driven by any suitable electric driving means and/or may be adapted for manual self-propulsion of the wheelchair, for example by the provision of annular hand grips.

I claim:

1. A kerb climbing device for use with a wheelchair having laterally spaced, opposed sides and at least one ground engaging wheel of relatively small diameter, said device comprising an axially telescopic guide arm adapted to be mounted on the wheelchair to extend forwardly of the small diameter wheel for locating a kerb in an operative position of said device and an axially rigid lifting arm adapted to be mounted on the wheelchair to extend forwardly of the small diameter wheel above said guide arm in said operative position of said device and pivotal in response to engagement of said guide arm with the kerb to engage the kerb and lift the small diameter wheel off the ground.

2. A device according to claim 1 wherein said lifting arm and guide arm are adapted to be mounted on the wheelchair for pivotal movement about a substantially horizontal axis extending between opposed sides of the wheelchair and means is provided for biassing said lifting arm and guide arm to said operative position.

3. A device according to claim 2 wherein said lifting and guide arm are connected to a pivot member comprising a shaft journalled for rotation about said horizontal axis in respective mounting brackets adapted for connection to the opposed sides of the wheelchair.

4. A device according to claim 2 wherein said lifting arm and guide arm are pivotal about said horizontal axis between said operative position and an inoperative position in which said lifting arm and guide arm extend rearwardly of the small diameter wheel.

5. A device according to claim 4 wherein said biassing means comprises an over-center spring linkage operable to bias said lifting arm and guide arm to each of said operative and inoperative positions.

6. A device according to claim 4 including a manually operable lever for pivoting said lifting arm and guide arm between said operative and inoperative positions.

7. A device according to claim 1 wherein said device is adapted for mounting on wheelchairs of different widths.

8. A device according to claim 1 wherein said device is adapted for detachable mounting on the wheelchair.

9. A device according to claim 1 wherein a friction device is provided at the free end of said lifting arm.

10. A device according to claim 1 wherein a jockey wheel is provided at the free end of said guide arm.

11. A wheelchair including first and second pairs of ground engaging wheels, said first pair of wheels being of relatively small diameter, and a kerb climbing device for assisting said first pair of wheels to mount a kerb, said device comprising an axially rigid lifting arm and an axially telescopic guide arm mounted on said wheelchair to extend forwardly of said first pair of wheels in an operative position of said device in which said guide arm is engageable with a kerb and said lifting arm is spaced above said guide arm and said lifting arm is pivotal in response to engagement of said guide arm with the kerb to engage the kerb and lift said first pair of wheels off the ground.

12. A wheelchair according to claim 11 wherein said lifting arm and guide arm are mounted centrally between said first pair of wheels for pivotal movement about a substantially horizontal axis extending between opposed sides of said wheelchair and means is provided for biassing said lifting arm and guide arm to said operative position.

13. A wheelchair according to claim 12 wherein said lifting arm and guide arm are connected to a pivot member comprising a shaft journalled for rotation about said horizontal axis in respective mounting brackets secured to opposed sides of said wheelchair.

14. A wheelchair according to claim 12 wherein said lifting arm and guide arm are pivotal between said operative position and an inoperative position in which said lifting arm and guide arm extend rearwardly of said first pair of wheels, and said biassing means comprises an over-center spring linkage biassing said lifting arm and guide arm to each of said operative and inoperative positions.

15. A wheelchair according to claim 11 wherein said device extends between and is detachably mounted on opposed sides of said wheelchair.

16. A wheelchair according to claim 11 including a respective electric motor for driving each of said second pair of wheels.

17. A wheelchair according to claim 11 wherein said first pair of wheels is at the front of said wheelchair and said second pair of wheels is at the back of said wheelchair.

18. A kerb climbing device for use with a wheelchair having laterally spaced, opposed sides and at least one ground engaging wheel of relatively small diameter, said device comprising a lifting arm and a guide arm adapted to be mounted on the wheelchair for pivotal movement about a substantially horizontal axis extending between the opposed sides of the wheelchair between an inoperative position in which said lifting arm and guide arm extend rearwardly of the small diameter wheel and an operative position in which said lifting arm and guide arm extend forwardly of the small diameter wheel with said lifting arm spaced above said guide arm and pivotal in response to engagment of said guide arm with a kerb to engage the kerb and lift the small diameter wheel off the ground, and an over-center spring linkage operable to bias said lifting arm and guide arm to each of said inoperative and operative positions.

19. A kerb climbing device for use with a wheelchair having laterally spaced, opposed sides and at least one ground engaging wheel of relatively small diameter, said device comprising a lifting arm and a guide arm adapted to be mounted on the wheelchair for pivotal movement about a substantially horizontal axis extending between the opposted sides of the wheelchair, a manually operable lever for pivoting the lifting arm and guide arm between an inoperative position extending rearwardly of the small diameter wheel and an operative position extending forwardly of the small diameter wheel, and means for biassing the lifting arm and guide arm in each of said operative and inoperative positions, wherein said operative position the lifting arm is spaced above the guide arm and is pivotal in response to engagement of the guide arm with a kerb to engage the kerb and lift the small diameter wheel off the ground.

20. A wheelchair including first and second pairs of ground engaging wheels, said first pair of wheels being of relatively small diameter, and a kerb climbing device for assisting said first pair of wheels to mount a kerb, said device comprising a lifting arm and a guide arm mounted centrally on said wheelchair between said first pair of wheels for pivotal movement about a substantially horizontal axis extending between opposed sides of said wheelchair, a manually operable lever for pivoting the lifting arm and guide arm between an inoperative position in which said lifting arm and guide arm extend forwardly of said first pair of wheels and an operative position in which said lifting arm and guide arm extend forwardly of said first pair of wheels with said lifting arm spaced above said guide arm and pivotal in response to engagement of said guide arm with a kerb to engage the kerb and lift the first pair of wheels off the ground, and an over-center spring linkage biassing said lifting arm and guide arm in each of said inoperative and operative positions.

* * * * *